(12) United States Patent
Zhu et al.

(10) Patent No.: US 10,333,788 B2
(45) Date of Patent: Jun. 25, 2019

(54) SYSTEM AND METHOD FOR ACQUIRING, PROCESSING AND UPDATING GLOBAL INFORMATION

(71) Applicant: Alibaba Group Holding Limited, Grand Cayman (KY)

(72) Inventors: Yunfeng Zhu, Hangzhou (CN); Yijun Lu, Hangzhou (CN); Yanchao Li, Hangzhou (CN); Jibin Lei, Hangzhou (CN); Yunfeng Tao, Hangzhou (CN); Zhiyang Tang, Hangzhou (CN); Jun Yu, Hangzhou (CN); Jia Feng, Hangzhou (CN); DongBai Guo, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 80 days.

(21) Appl. No.: 15/390,479

(22) Filed: Dec. 24, 2016

(65) Prior Publication Data
US 2017/0187578 A1 Jun. 29, 2017

(30) Foreign Application Priority Data
Dec. 29, 2015 (CN) .......................... 2015 1 1017784

(51) Int. Cl.
*H04L 12/24* (2006.01)

(52) U.S. Cl.
CPC ...... *H04L 41/0889* (2013.01); *H04L 41/0816* (2013.01); *H04L 41/0859* (2013.01); *H04L 41/50* (2013.01)

(58) Field of Classification Search
CPC ............. H04L 41/0889; H04L 41/0816; H04L 41/0859; H04L 41/05
See application file for complete search history.

(56) References Cited

U.S. PATENT DOCUMENTS

| 5,828,665 A | 10/1998 | Husak |
| 5,893,117 A | 4/1999 | Wang |

(Continued)

FOREIGN PATENT DOCUMENTS

| CN | 101043419 A | 9/2007 |
| CN | 104519130 A | 4/2015 |
| CN | 105282045 A | 1/2016 |

OTHER PUBLICATIONS

International Search Report and Written Opinion to corresponding International Application No. PCT/US2016/068175 dated Mar. 10, 2017 (11 pages).

(Continued)

*Primary Examiner* — George C Neurauter, Jr.
(74) *Attorney, Agent, or Firm* — James J. DeCarlo; Greenberg Traurig, LLP

(57) ABSTRACT

Embodiments of the disclosure describe a system, method, and apparatus for acquiring global information. The method comprises receiving current version information from a global information server, the current version information associated with current global information and associated with a network service; retrieving the current global information associated with the current version information and associated with the network service from the global information server; and providing or suspending the network service associated with the current global information based on a presence of a stop-write identifier in the current global information.

20 Claims, 14 Drawing Sheets

(56) References Cited

U.S. PATENT DOCUMENTS

| | | |
|---|---|---|
| 6,192,398 B1 | 2/2001 | Hunt |
| 6,910,148 B1 | 6/2005 | Ho et al. |
| 6,950,820 B2 | 9/2005 | Bae |
| 7,710,934 B2 | 5/2010 | Cho et al. |
| 7,870,226 B2 | 1/2011 | Anna et al. |
| 7,958,092 B2 | 6/2011 | Werner et al. |
| 8,141,156 B1 | 3/2012 | Mao et al. |
| 8,151,062 B2 | 4/2012 | Krishnaprasad et al. |
| 8,352,634 B2 | 1/2013 | Shen et al. |
| 8,843,441 B1* | 9/2014 | Rath ................. G06F 16/27 707/614 |
| 9,374,310 B2 | 6/2016 | Natarajan et al. |
| 2002/0131075 A1 | 9/2002 | Kremer |
| 2002/0161917 A1 | 10/2002 | Shapiro et al. |
| 2003/0051236 A1 | 3/2003 | Pace et al. |
| 2003/0067924 A1 | 4/2003 | Choe et al. |
| 2004/0205569 A1 | 10/2004 | McCarty et al. |
| 2005/0105524 A1* | 5/2005 | Stevens ................. H04L 45/04 370/389 |
| 2005/0182498 A1 | 8/2005 | Landou et al. |
| 2005/0265346 A1 | 12/2005 | Ho et al. |
| 2006/0106940 A1 | 5/2006 | Jagannathan et al. |
| 2006/0136513 A1 | 6/2006 | Ngo et al. |
| 2007/0226269 A1 | 9/2007 | Anna et al. |
| 2008/0021866 A1 | 1/2008 | Hinton et al. |
| 2008/0086737 A1 | 4/2008 | Bae et al. |
| 2008/0259844 A1 | 10/2008 | Richeson et al. |
| 2010/0076831 A1 | 3/2010 | Samuel |
| 2010/0076931 A1 | 3/2010 | Bornhoevd et al. |
| 2010/0235509 A1 | 9/2010 | Xia |
| 2011/0135275 A1 | 6/2011 | Katsuo et al. |
| 2012/0143903 A1 | 6/2012 | Scully et al. |
| 2013/0047122 A1 | 2/2013 | Ijas et al. |
| 2013/0066866 A1 | 3/2013 | Chan et al. |
| 2013/0138834 A1* | 5/2013 | Imamura ................ G06F 9/5088 709/242 |
| 2014/0189484 A1 | 7/2014 | Fountenberry |
| 2015/0178135 A1* | 6/2015 | Wang ................. G06F 16/285 718/104 |
| 2015/0347326 A1 | 12/2015 | Pandya et al. |
| 2016/0112516 A1* | 4/2016 | Liu ................. H04L 67/1097 709/223 |
| 2016/0337264 A1 | 11/2016 | Murashko et al. |

OTHER PUBLICATIONS

International Search Report and Written Opinion to corresponding International Application No. PCT/US2016/068177 dated Mar. 10, 2017 (14 pages).

International Search Report and Written Opinion dated Mar. 16, 2017 to corresponding International Application No. PCT/US2016/068618.

International Preliminary Report on Patentability to International Application No. PCT/US2016/068175 dated Jul. 12, 2018 (10 pages).

International Preliminary Report on Patentability to International Application No. PCT/US2016/068177 dated Jul. 12, 2018 (13 pages).

International Preliminary Report on Patentability to corresponding International Application No. PCT/US2016/06818 dated Jul. 12, 2018 (13 pages).

* cited by examiner

SYSTEM AND METHOD FOR ACQUIRING, PROCESSING AND UPDATING GLOBAL INFORMATION

CROSS-REFERENCE TO RELATED APPLICATIONS

This application claims the benefit of priority from Chinese Patent Application No. 201511017784.X, filed on Dec. 29, 2015, entitled "Global Information Acquisition and Processing and Method, Apparatus and System for Updating of Same," which is incorporated herein by reference in its entirety.

BACKGROUND

Field of the Disclosure

This disclosure relates to the field of Internet technologies, and in particular, relates to systems and methods for acquiring, processing, and updating global information.

Description of the Related Art

With the rapid development of e-commerce globalization, cross-region e-commerce transactions are becoming increasingly popular and frequent.

E-commerce services deployed in a large-scale and cross-region distributed environment generally face requirements to update and maintain the consistency of global information. In addition, in order to maintain service continuity, highly efficient updates and global consistency of data and information are required. For example, IP address translation configuration data in a Virtual Private Cloud (VPC) service, or global information of international e-commerce platforms offered by eBay, Amazon, and others are required to be updated, and consistency of global information must be maintained.

In an example where the global information includes routing table data, during the process of implementing e-commerce transactions, data operations of a user at an Internet Data Center (IDC) are involved. In order to rapidly respond to a user's data operation requests and ensure global data consistency, international e-commerce platforms (such as Alibaba, Amazon, and eBay) will generally configure a certain number of IDCs in several regions, assign the nearest IDC to a user based on the user's location, and record the IDC to which the user is assigned in the routing table. Based on the data operation requests from the users serviced by the routing table, the users within each region will be serviced by a nearby IDC and all data operations of a user may be directed to the same IDC.

In practice however, a user may perform cross-region data operations. For example, when a user travels to other cities (or immigrates to another country), the IDC to which the user is assigned needs to be re-assigned, and the routing table needs to be updated to provide a rapid response to the user's data operation request and ensure global data consistency.

Current techniques for updating a routing table generally involve pushing the latest version of an updated routing table to application servers of each region under the control of a Management Control System (MCS) running on the platform. The application server correspondingly returns, updates, confirms, and notifies the MCS after receiving the latest version of the routing table, and suspends data operation requests serving the user.

The MCS then sends an enable instruction based on the latest routing table to the application servers after confirming that the latest version of the routing table is received by all the application servers in each region. Finally, the application servers restore normal service after receiving the enable instruction, which enables the application server in each region to use a uniform routing table to serve the user.

However, in a large-scale, cross-regional update scenario of a routing table, the time consumed by the application servers using the above technique while acquiring the complete, latest version of the routing table is significantly long due to the size of the routing table. Since there are differences in operating conditions such as network link condition, physical distance, and the like, when the application servers in some regions have received the latest version of the routing table other application servers may not have received the latest version of the routing table.

Thus, using current techniques, updating the routing tables by the plurality of application servers may take a significant amount of time. Specifically, during the process of updating data, application servers may suspend services for a significant amount of time, which may result in low service efficiency and user dissatisfaction. Conversely, if an application server immediately provides services upon receiving the latest version of the routing table, and each application server provides these services based on different routing tables, global data inconsistency will result. In addition, other global information in a large-scale and cross-region update scenario may also be subjected to the problem that service efficiency is low or global data is inconsistent.

Therefore, there the efficiency of updating global information using current techniques is poor and problems may arise where both the service efficiency and global data consistency cannot be taken into consideration.

BRIEF SUMMARY

In view of the above technical problems, embodiments of the disclosure are directed to providing a method and device for acquiring global information, a method and device for processing global information, and a method, device and system for updating global information, to overcome or at least partially solve the above technical problems.

One aspect of the present disclosure provides a method for maintaining the consistency of global information The method includes receiving current version information from a global information server, the current version information associated with current global information and associated with a network service; retrieving the current global information associated with the current version information and associated with the network service from the global information server; and providing or suspending the network service associated with the current global information based on a presence of a stop-write identifier in the current global information.

One aspect of the present disclosure provides an apparatus for maintaining the consistency of global information. The apparatus includes a processor; and a non-transitory memory storing computer-executable instructions. The instructions, when executed by the processor, cause the apparatus to receive current version information from a global information server, the current version information associated with current global information and associated with a network service; retrieve the current global information associated with the current version information and associated with the network service from the global information server; and provide or suspend the network service associated with the current global information based on a presence of a stop-write identifier in the current global information.

One aspect of the present disclosure provides a system for maintaining the consistency of global information. The system includes a global information server configured to store version information and global information; a global information update management control device configured to transmit version information and global information to the global information server; and an application server configured to: receive current version information from a global information server, the current version information associated with current global information and associated with a network service; retrieve the current global information associated with the current version information and associated with the network service from the global information server; and provide or suspend the network service associated with the current global information based on a presence of a stop-write identifier in the current global information.

Embodiments of the disclosure have the following advantages.

In some embodiments, by providing or suspending a service provided for global information according to a stop-write identification status of the global information, in a large-scale cross-region global information update scenario, an application server needs to suspend the service provided for the global information only upon acquiring the global information having a stop-write identification. In this way, the service efficiency is improved all the while ensuring global data consistency.

In addition, the application server acquires version information and acquires corresponding global information from a global information server, and the global information server independently receives global information of various versions pushed by a global information update management control device. By means of decoupling the update processes of the global information and the version information, even if there are differences in various conditions such as network link, physical distance and the like, there is a relatively smaller gap between the time when various application servers acquire the version information. As such, update of the global version information may be implemented within a relatively shorter time period, and thus the efficiency of updating the global information is improved.

DETAILED DESCRIPTION

To make the objectives, features, and advantages of the disclosure clearer and more understandable, the disclosure is described in detail with reference to the attached drawings and specific embodiments.

Figure 1:
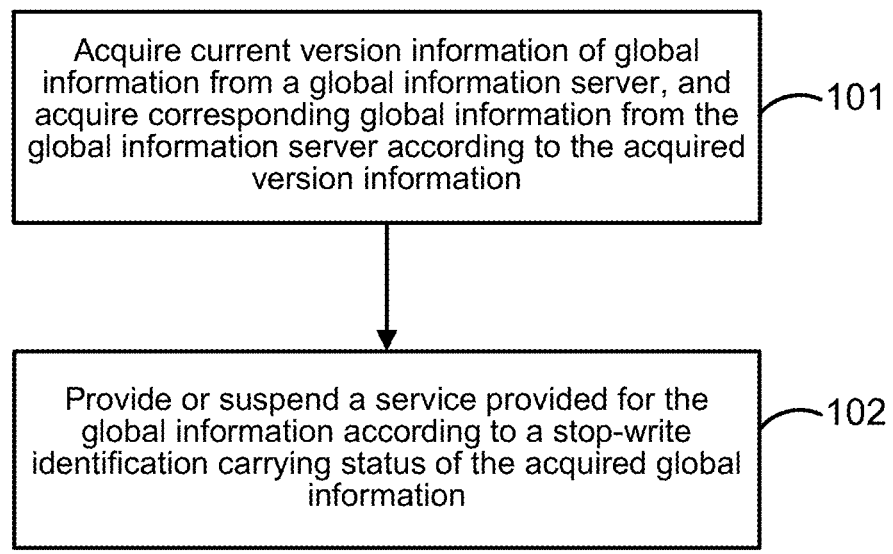
FIG. 1 is a flow diagram of a method for controlling the provision of services based on updated global information according to some embodiments of the disclosure.

FIG. 1 is a flow diagram of a method for controlling the provision of services based on updated global information according to some embodiments of the disclosure.

In step 101, the method acquires current version information of global information from a global information server and then acquires the global information from the global information server corresponding to the acquired current version information. In one embodiment, the global information may be IP address translation configuration data associated with a VPC service, or a global routing table, or any information which needs to be updated in a global manner to ensure global data consistency thereof. A person skilled in the art may additionally apply the method to scenarios involving the updating of various types of global information according to actual needs.

In a global information update system implemented on an e-commerce platform, a global information update management control device, a global information server, and an application server may be configured to implement the method illustrated in the embodiments of disclosure.

In one embodiment, global information update management control device is responsible for coordinating the updating of global information. Specifically, the global information update management control device actively pushes updated global information and corresponding version information to global information servers deployed in a plurality of regions. Alternatively, or in conjunction with the foregoing, a global information update management control device may modify the version information of the global information servers when pushing the updated global information to global information servers deployed in a plurality of regions.

Since the process of transmitting a relatively large amount of global information takes a long period of time, the global information update management control device may only push the global information to the global information servers, instead of triggering update and upgrade of the global information. Upon pushing a relatively smaller amount of version information to the global information servers, the global information update management control device may trigger the updating and upgrading of the global information. In some embodiments, the above global information update management control device may be a Management Control System (MCS).

The global information server may include a global information cache server storing the global information and a version information management server storing the version information.

In one embodiment, the global information server may be deployed in a region of an application server. Alternatively, or in conjunction with the foregoing, the global information servers may each be provided with a global information cache system and a version information management system. The global information cache system may cache the global information of various versions pushed by the global information update management control device. The version information management system may cache version information of the global information of various versions pushed by the global information update management control device, or receive modifications made by the global information update management control device on the stored version information. Additionally, the version information management system may also be responsible for coordinating the update processes of version information of the global information of various application servers in a region, so as to ensure data consistency of the global information.

In alternative embodiments, the global information cache system and the version information management system may be deployed on two servers (i.e., a global information cache server and a version information management server) deployed in each region. The global information cache server is responsible for caching the global information pushed by the global information update management control device, and the version information management server is responsible for storing the version information of global information of various versions, and coordinating update processes of the version information of various application servers in this region. In some embodiments, since the global information may be significantly large and may consume a long transmission time, the global information may be pushed in advance to the global information cache server. Upon completion of pushing the global information, the version information management server may be triggered to update the version information recorded by various application servers in this region, thereby implementing separation of the global information from the version information.

The application servers may be various application servers corresponding to various applications of the e-commerce platform. The application server may detect the latest version information pushed by the global information update management control device to the global information servers or the modifications made to the version information by subscribing to latest version information of the global information from the version information management system of the global information server in this region. By subscribing, the application servers may acquire the latest version information of the global information from the global information servers.

In one embodiment, before step 101, version information of the global information in the global information server may be subscribed to by one or more application servers. When the application server(s) receives version information update notifications sent by the global information server, the current version information of the global information is downloaded from the global information server. By subscribing to the global information server, the application server is can timely acquire global information that needs to be updated. This improves the efficiency of updating the global information.

In some embodiments, the application server receives current version information of the global information from the global information server, and then acquires global information corresponding to the received version information from the global information server. In some embodiments, the application server may receive or retrieve a complete copy of the latest version of the global information. Alternatively, the application server may receive or retrieve only an updated portion of the global information.

In one embodiment, the step of acquiring global information from the global information server corresponding to the acquired version information may further include updating historical version information (e.g., version information currently stored at an application server) according to the acquired version information and returning an update confirmation notification to the global information server. Additionally, the step of acquiring corresponding global information from the global information server corresponding to the acquired version information may further include acquiring corresponding global information from the global information server according to the updated version information.

As illustrated in the above embodiment, historical version information originally recorded in the application server may be updated according to version information acquired from a global information server. As discussed previously, the application server may additionally acquire, according to the updated version information, global information corresponding to the version information, thereby acquiring the updated global information. Upon completion of acquiring updated global information, the application server may return an update confirmation notification to the global information server. The global information server collects the update confirmation notification and returns the notification to the global information update management control device.

Compared to the prior art, where a conventional application server acquires voluminous and complete global information and correspondingly returns an update confirmation notification, the application server according to the embodiments in the disclosure may immediately return an update confirmation notification upon acquiring version information having a smaller data volume, and acquire corresponding global information from the global information server according to the updated version information. The global information server may independently receive the global information of various versions pushed by the global information update management-control device. By decoupling the update processes of the global information and the version information, even if there are differences in various conditions such as network link, physical distance and the like, there is a relatively smaller gap between the times when various application servers acquire the version information. As such, update of the global version information may be implemented within a relatively shorter time period.

In step 102, the method provides or suspends a service associated with the global information according to a stop-write identification status present in the acquired global information.

Since conditions such as network link health, physical distance, and the like from the global information servers to various application servers in this region are greatly different, it may be possible that some of the application servers have received the latest version information, whereas some of the application servers are still in the process of receiving the latest version information. No matter how ideal external conditions are it cannot be ensured that all application servers simultaneously receive the latest version information. If the application servers use different versions of global information to provide services, inconsistencies between application servers may result. To ensure global data consistency, global information needs to be used globally and uniformly. Thus, using conventional techniques, application servers acquiring the latest version information need to enter a waiting phase, and are incapable of continuously providing services for users. This affects user experience of the e-commerce platform. Therefore, the update efficiency of the conventional techniques for updating global information is low, and the service efficiency and global data consistency is not ensured.

However, in most scenarios, not all of the global information is updated. Therefore, the service related to the updated global information must be suspended, but the other global information may still be used for providing services.

To remedy the above technical problems, the global information update management control device adds a "stop-write" identification to the global information which has been, or will be, changed. The stop-write identification is used for suspending the providing of a service, or services, associated with the global information. The global information update management control device may push the global information of this version and the corresponding version information to the global information server.

Upon acquiring the global information from the global information server, the application server may correspondingly provide services or suspend services related to the global information according to the stop-write identification status of the global information. Specifically, the method may determine whether the global information includes a stop-write identification. If so, the method suspends the service associated with the global information. If not, the service associated with the global information is provided.

With respect to global information having a stop-write identification status, transitional global information and corresponding transitional version information may be generated. Version information of the transitional version may then be inserted between the interval of an update from global information of a historical version to global information of a latest version. That is, the global information of the historical version is first updated to the transitional version information, and then updated from the transitional version information to the global information of the latest version. As such, during the entire update process of the global information, even if version information of an earlier version and the transitional version information, or the transitional version information and version information of a latest version simultaneously exist in the application server, global data consistency may not be affected. The affected services are restricted only to those services related to the partial global information which includes a stop-write identification and is to be updated in the global information.

Therefore, version information of a transitional version is introduced during the process of updating version information of a historical version to version information of a latest version, and the historical version is first updated to the transitional version, and then updated to the latest version. These two update processes both reduce the impacts caused by update of the global information to the services all the while ensuring global data consistency, maintaining service continuity, and preventing the problem that, during update of the global information, services need to be completely suspended for a significant time period, thus affecting user experience.

In some embodiments, by providing or suspending a service provided for global information according to a stop-write identification status of the global information, in a large-scale cross-region global information update scenario, the application server needs to suspend the service associated with the global information only upon acquiring the global information having a stop-write identification. In this way, the service efficiency is improved all the while ensuring global data consistency.

In addition, the application server acquires version information and acquires corresponding global information from a global information server, and the global information server independently receives global information of various versions pushed by a global information update management control device. By means of decoupling the update processes of the global information and the version information, even if there are differences in various conditions such as network link, physical distance and the like, there is a relatively smaller gap between the time when various application servers acquire the version information. As such, update of the global version information may be implemented within a relatively shorter time period, and thus the efficiency of updating the global information is improved.

Figure 2:
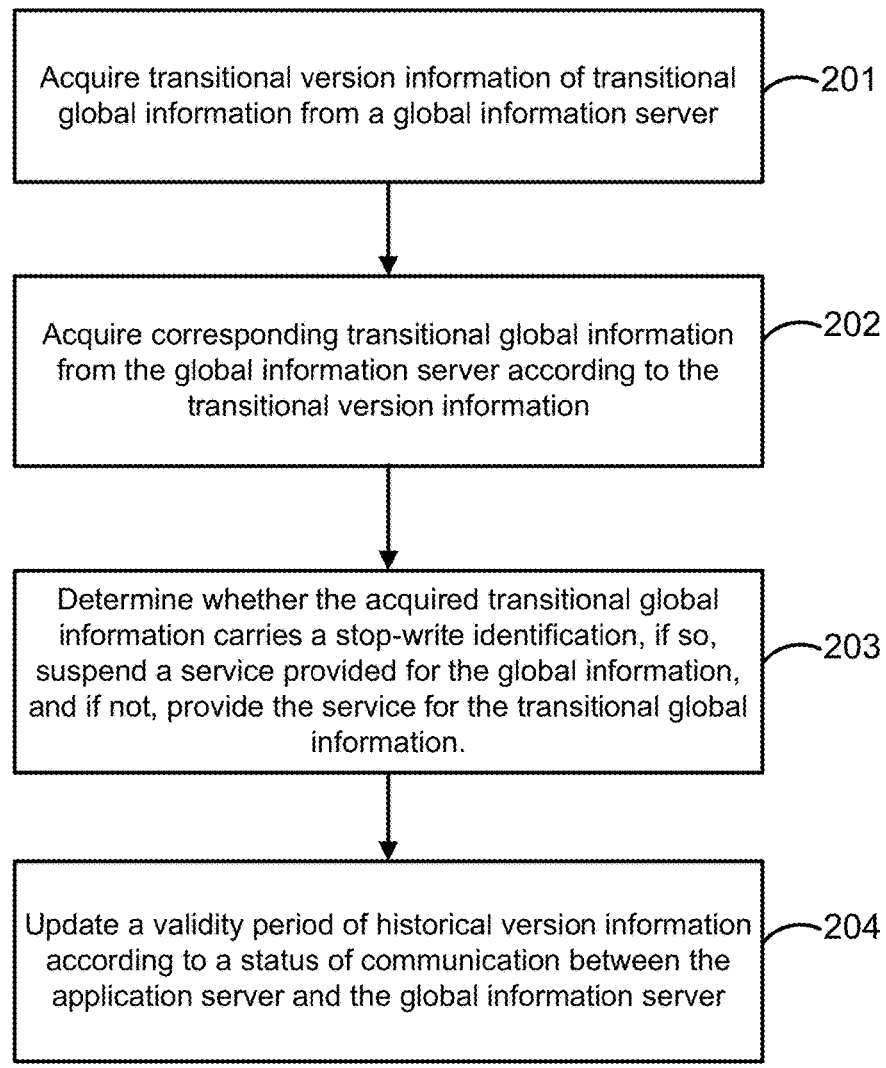
FIG. 2 is a flow diagram of steps of a method for acquiring global information according to some embodiments of the disclosure.

FIG. 2 is a flow diagram of a method for acquiring global information according to some embodiments of the disclosure.

In step 201, the method acquires transitional version information of transitional global information from a global information server.

During the process of updating global information from a historical version to a latest version, before a global information update management control device transmits the global information of the latest version and the corresponding version information, the global information update management control device adds a stop-write identification with respect to global information which has changed or will be changed, and generates transitional global information and corresponding transitional version information. This stop-write identification is used for suspending the service related to specific global information.

The global information update management control device may push the transitional global information and the corresponding transitional version information to the global information server. The application server may acquire the transitional version information of the global information from the global information server by means of subscription.

Accordingly, the version information of the transitional version is inserted during the update of the historical version of global information to the latest version. When the global information of an entire system is updated, firstly, the historical version of global information is updated to the transitional version information, and secondly, the transitional version information is updated to the latest version.

In step 202, the method acquires corresponding transitional global information from the global information server according to the transitional version information.

In step 203, the method determines whether the acquired transitional global information includes a stop-write identification. If the method determines that the acquired transitional global information includes a stop-write identification, the method suspends a service associated with the global information or, if not, provides or continues to provide the service for the transitional global information.

In some embodiments, the application server acquires the corresponding transitional global information from the global information server according to the transitional version information. In alternative embodiments, complete transitional global information may be acquired or only transitional global information which needs to be used may be acquired.

With respect to the acquired transitional global information, it may be determined whether a stop-write identification is included within the transitional global information. If a stop-write identification is included in the transitional global information, services associated with the global information may be suspended. If a stop-write identification is not included, the service for the transitional global information is provided or may continue to be provided. If the transitional global information includes a stop-write identification, it indicates that the global information has been changed or will be changed. If the global information is used to provide a service (e.g., used for modifying related data in the Internet data center), data modifications may conflict with other data modifications which have been made using the historical global information since the global information update is not complete, causing global data inconsistency. Therefore, the service associated with the transitional global information needs to be suspended to ensure global data consistency. However, if the global information does not include a stop-write identification, it indicates that the global information is not changed, and that providing the service associated with the global information will not cause global data inconsistency. Therefore, the global information may be used to continuously provide the corresponding service.

In some embodiments, the global information of a transitional version is inserted during process of updating a historical version of the global information to the latest version. The application server acquires the global information according to the transitional version information, and only when global information including the stop-write identification is acquired, some services need to be suspended, the non-service time of the global system is greatly compressed, which prevents the problem that the services of the global system cannot be used for a long time during the update. As such, on the premise of ensuring the consistency of the global data, the continuity of the service on the electronic business platform is promoted, and the impact on the user during the update of the global information is reduced.

In step 204, the method updates a validity period of historical version information according to a status of communication between the application server and the global information server.

It should be noted that in practice, a large number of application servers of a cross-border e-commerce platform, because of a network anomaly or "apparent death" of the update process, and the like, may be missed by the global information update management control device when the global information update management-control device confirms the update of the application server with respect to the version information via the global information server. In this scenario, the global information update management-control device then mistakenly believes that all application servers have acquired the updated version information and initiates an instruction enabling the global information of the latest version to the application server. However, in the above scenario, these application servers miss the update of the version information, do not know that their version information has expired, and continuously use the historical version information to provide services for the user, which may ultimately cause global data inconsistency.

To solve the above technical problem, embodiments of the disclosure provide a distributed coordination and management mechanism for global information and version information based on validity period.

In one embodiment, the communication status of the application server and the global information server may be first determined. When the communication status is normal, the validity period of the historical version information that is being used may be reset, and the historical version information is normally used for providing services for the user within the validity period. When the communication status is abnormal, for example, the application server cannot connect to the global information server during a period of time, it is determined that the historical version information is invalid. Within this period of time, the global information of a latest version may be updated. Continuous use of historical version information for providing services for the user may result in global data inconsistency. Therefore, the historical version information needs to be suspended.

A communication status may be determined in a plurality of manners including, for example, by sending heartbeat packets to each other. A validity period of the version information may additionally be defined according to the actual needs. For example, the application server may automatically negotiate with the global information server to determine the validity period.

The validity period of the historical version information is updated according to the communication status of the application server and the global information server. In the case where the communication status is abnormal, the application server stops providing the services, which prevents the problem of global data inconsistency caused by the application server due to the network anomaly or "apparent death" of the update process.

In one embodiment, step 204 may further comprise sending confirmation information of a first communication status to the global information server regularly, resetting a validity period of the current version information when receiving confirmation information of a second communication status returned by the global information server within a preset period of time, determining that the current version information becomes invalid, and suspending the service provided for the global information when the confirmation information of a second communication status returned by the global information server is not received within the preset period of time.

In one embodiment, the application server may regularly send the confirmation information of a first communication status to the global information server. If the communication status is normal, the global information server may receive the confirmation information of a first communication status within the preset period of time and correspondingly return the confirmation information of a second communication status. When the application server receives the confirmation information of a second communication status, it indicates that the application server and the global information server are currently in normal communication status, that the validity period of the version information of the currently used global information may be reset, and a service acquisition request from a user is still processed by using the version information.

When the confirmation information of a second communication status returned by the global information server is not received with the preset period of time, it indicates that the communication between the application server and the global information server encountered an exception. Within this time period, the version information of the global information may need to be updated. In this scenario, the application server may determine that the current version information has become invalid and may not be used any longer for providing services for users, ensuring global data consistency.

The following example is provided in order to illustrate the application of a distributed coordination and management mechanism for global information and version information based on validity period.

An application server may be used as a client in the distributed coordination and management mechanism for global information and version information, and the global information server may be used as a server therein. A validity period of a connection status between the client and the server is represented by using a Session. When the client registers a Session to the server, a Client Session Timeout (CST) needs to be assigned, and the server calculates a corresponding Server Session Timeout based on the Client Session Timeout. The client and the server mutually confirm their validity by means of a heartbeat. If a heartbeat response is not received from one end within the Session Timeout of the other end, it may be actively determined that the Session times out.

The Session Timeout mutually negotiated between the client and the server ensures that when the server determines, according to the Server Session Timeout, a Session times out, correspondingly the client may also determine in advance, according to the Client Session Timeout thereof, when the Session times out.

Figure 11:
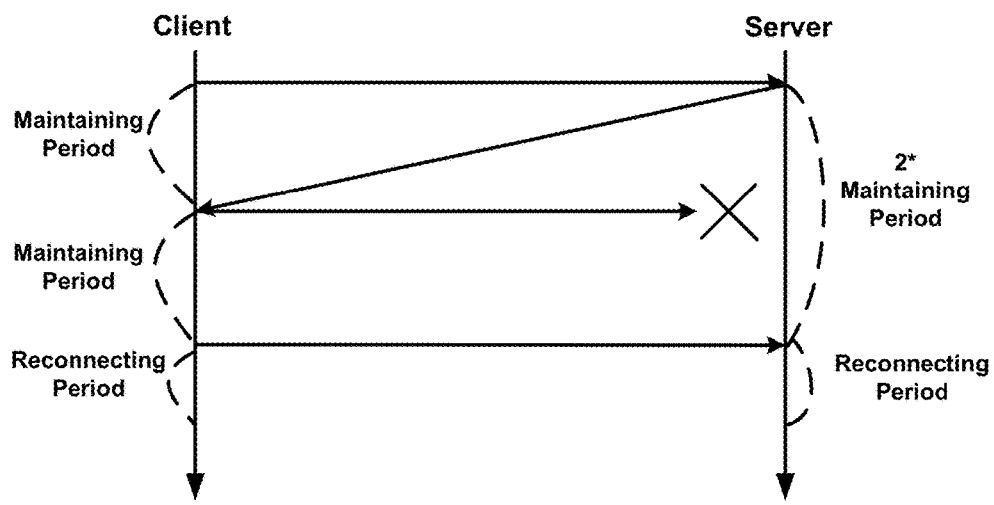
FIG. 11 illustrates Session Timeout negotiation procedure between a client and a server according to some embodiments of the disclosure.

FIG. 11 illustrates Session Timeout negotiation procedure between a client and a server according to some embodiments of the disclosure.

The Session Timeout of the client is partitioned into a Maintaining Period (MP) for determining that the Session is normal, and a Reconnecting Period (RP) for reconnecting to the server upon detection of a connection exception. In one embodiment, the server immediately receives a heartbeat packet sent by the client, but does not receive a heartbeat packet response upon completion of the second MP. In this case, it may be considered that the connection between the client and the server encounters an exception, and the procedure enters the RP stage for reconnecting to another server, and meanwhile it is determined that the Session times out. The server, while waiting for the heartbeat packet, also needs to determine whether the Session times out in this case. Therefore, the Client Session Timeout may be set as the total of MP and RP (e.g., MP+RP), whereas the Server Session Timeout may be at least set as RP and two times the MP (e.g., 2·MP+RP) or twice the CST (e.g., 2·CST). In this way, the negotiated Session Timeout may ensure that the client and the server make a consistent determination that the Session times out.

In the distributed coordination and management mechanism for global information and version information, each application server may determine a Client Session Timeout based on a Lease value indicative of a validity period of associated data, and register a Session to the global information server in a region.

Figure 12:
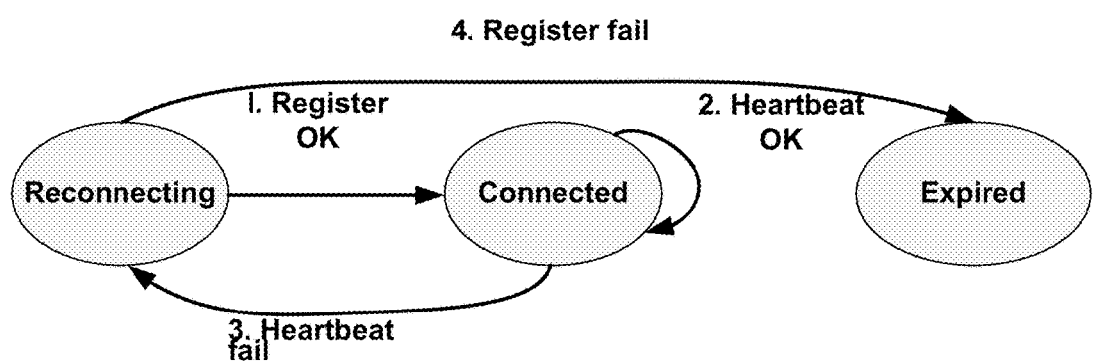
FIG. 12 is a state diagram of a Session registration procedure, according to some embodiments of the disclosure.

FIG. 12 is a state diagram of a Session registration procedure, according to some embodiments of the disclosure.

After successfully registering, an application server may immediately enter a "Connected" status, and start a Lease validity period associated with version information of the local global information. Afterwards, the application server maintains a periodical mutual heartbeat confirmation with the version information management system of the global information server in this region (as discussed above), and resets the Lease validity period corresponding to the local version information according to a heartbeat response.

If the application server does not receive a heartbeat response, the application server may return to a Reconnecting status, and attempt to re-register a Session. If the registration fails within the Client Session Timeout, it may be determined that the Session times out, that is, the Lease validity period corresponding to the version information of the local global information becomes invalid, and all the operations related to the version information are denied, to maintain global data consistency.

It should be noted that the application server maintains communication with the global information server, which is intended to synchronize the global status in addition to enabling the application server to suspend services provided when the global information becomes invalid. As known from the above embodiment illustrating application of the distributed coordination management mechanism for global information and version information, both the application server and the global information server maintain the validity period of historical version information on the application server. For example, according to the Session Timeout mutually negotiated between the application server and the global information server, MP and RP are respectively 20 seconds and 10 seconds, and if the application server does not receive a heartbeat response from the global information server within these 30 seconds (i.e., MP+RP), the application server may determine that the maintained historical version information has become invalid. In this case, if the global information server does not receive a heartbeat confirmation from the application server within 50 seconds (i.e., 2·MP+RP), the global information server would consider that the application server has failed, and mark the application server as a failed one in the update list. Therefore, based on the heartbeat confirmation and the heartbeat response, both the application server and the global information server maintain the validity period of the historical version information, and an application server inevitably knows failure thereof while the global information server determines the application server fails. In some embodiments, users may know the current update status of the global information from the global information server, ensuring synchronization of the global status of the update process.

Figure 3:
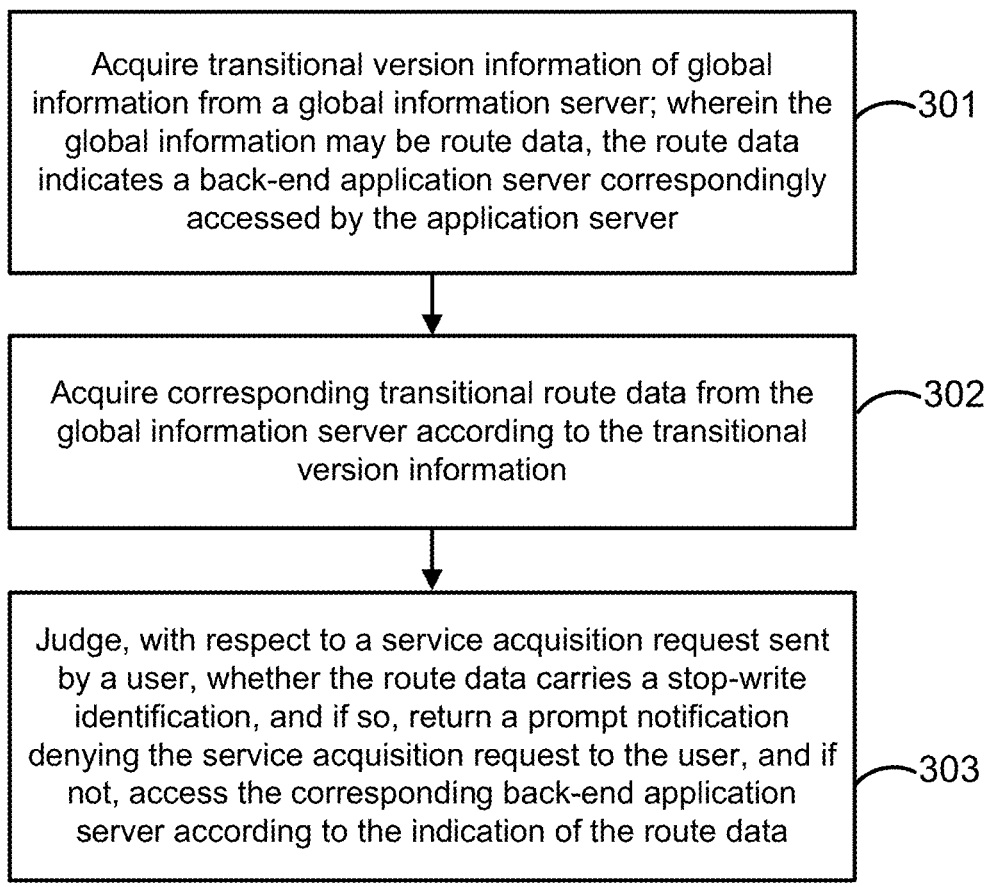
FIG. 3 is a flow diagram of steps of a method for acquiring global information according to some embodiments of the disclosure.

FIG. 3 is a flow diagram of steps of a method for acquiring global information according to some embodiments of the disclosure.

In step 301, the method acquires transitional version information of global information from a global information server. In one embodiment, the global information may be route data indicating a back-end application server correspondingly accessed by the application server.

Using route data as an example, when updating global route data, access records of the users may be analyzed by using a cross-border e-commerce platform to know in which regions the users use the e-commerce platform within a time period. In this manner, the platform can determine which regions the users are in and the corresponding Internet data centers to utilize for each user. When the Internet data center to which the users are assigned to is inconsistent with the record in the global information of a history version, the route data needs to be updated, such that an update demand on the route data is generated.

A user may submit a service acquisition request based on an application to the e-commerce platform, wherein the service acquisition request may be data operations such as adding, deleting, modifying, and the like related data in a database in the Internet data center. The e-commerce platform may send the service acquisition request to the application server for specific processing.

The application servers may be various application servers corresponding to various applications of the e-commerce platform. With respect to the service acquisition request submitted by the user, the application server extracts a user ID from the service acquisition request, and queries the Internet data center to which the user is assigned from the global information server according to the user ID and the version information of the currently used global information recorded by the application server itself, so as to access the Internet data center to acquire related data services.

The route data may indicate the Internet data center to which the user is assigned, that is, the Internet data center that should be accessed by the application server. Therefore, the application server accesses the corresponding Internet data center according to the route data and performs data operations with respect to the data of the user in the Internet data center according to the service acquisition request, so as to satisfy the user's service demand.

In one embodiment, the application server may acquire the current transitional version information of the route data from the global information server. In addition, the application server may update the original historical version information according to the acquired transitional version information, and return an update confirmation notification to the global information server in this region.

In step 302, the method acquires corresponding transitional route data from the global information server according to the transitional version information.

In step 303, the method determines, with respect to a service acquisition request sent by a user, whether the route data includes a "stop-write" identification, and if so, returns a prompt notification denying the service acquisition request to the user. If the service acquisition request does not include a "stop-write" identification, the method accesses the corresponding back-end application server according to the indication of the route data.

Upon receiving the service acquisition request submitted by the user, the application server acquires corresponding transitional route data from the global information server according to transitional version information.

In some embodiments, not all the users assigned to a Internet data center would be subjected to changes. Therefore, a global information update management control device may add a stop-write identification for the route data which has been changed or is to be changed in the global information, wherein the stop-write identification is used for suspending operations such as writing data which may cause global data inconsistency with respect to the Internet data center to which the user is practically homed or originally homed.

Figure 10:
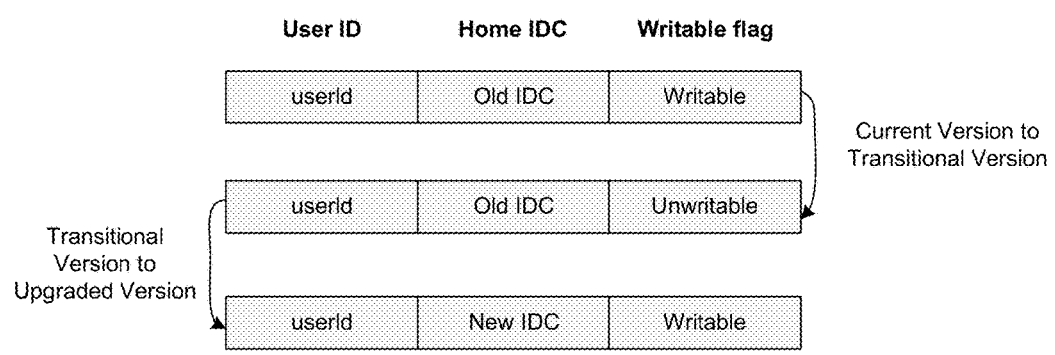
FIG. 10 is a diagram of version update procedure for a routing table according to some embodiments of the disclosure.

FIG. 10 is diagram of a version update procedure for a routing table according to some embodiments of the disclosure.

In the route data of a transitional version, each piece of route data may comprise a user ID, a home IDC corresponding to each user ID, and a flag indicating whether the user can write data with respect to the home IDC.

As discussed above, it may be determined whether the route data includes a stop-write identification. If the route data includes a stop-write identification, it indicates that the region where the user is located has been changed, and the Internet data center to which the user is currently assigned is inconsistent with the Internet data center to which the user was originally assigned. In this case, if the user is still allowed to access the Internet data center to which the user is originally assigned, global data inconsistency may be caused when the user writes data relating to the Internet data center to which the user is originally assigned. Therefore, a prompt notification denying the service acquisition request submitted by the user may be returned to the user, so as to temporarily deny the user's access to the Internet data center to which the user is originally assigned. If the route data does not include a stop-write identification, the corresponding back-end application server is accessed according to the instruction of the route data.

Upon acquiring the transitional version information, the application server may immediately provide services for the user. The application server needs to deny the user's access to the Internet data center to which the user is currently assigned or originally assigned only when acquiring the route data including the stop-write identification. That is, in the transitional version, the application server only needs to suspend some provided services to some users, causing no impacts to other users.

The update process of the route data is divided into two steps by introduction of transitional version information of the route data and route data of the transitional version including a stop-write identification. Firstly, version information of an earlier version is updated to transitional version information, and then upon completion of update of the transitional version information, an update is started to update to version information of a latest version. This update manner results in different time points when the application server receives the version information, and ensures services are provided to the users by globally using consistent route data to thus ensure global data consistency, with no need of completely suspending the services.

Figure 4:
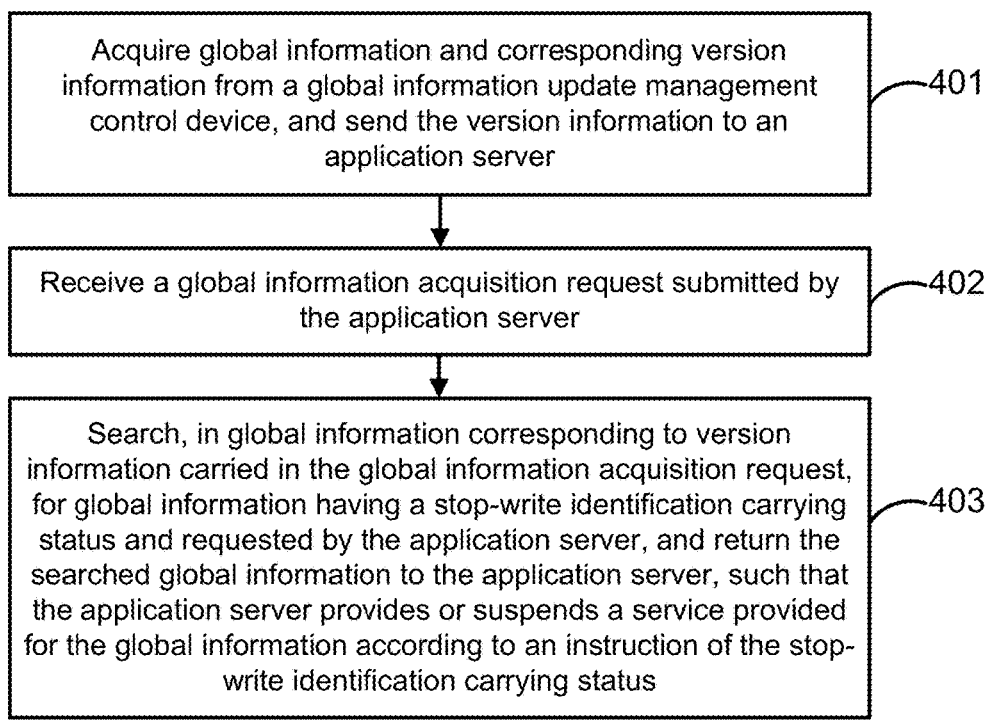
FIG. 4 is a flow diagram of steps of a method for processing global information according to some embodiments of the disclosure.

FIG. 4 is a flow diagram of steps of a method for processing global information according to some embodiments of the disclosure.

In step 401, the method acquires global information and corresponding version information from a global information update management control device and sends the version information to an application server.

In some embodiments, the global information server acquires global information of a latest version and corresponding version information from the global information update management control device.

Global information servers may each be provided with a global information cache system and a version information management system. The global information cache system may store information of various versions such as the historical version, transitional version and latest version. The version information management system may store version information of the global information of various versions such as the historical version, transitional version and latest version information acquired from the global information update management control device, or accept the modifications made by the global information update management control device to the stored version information. Nevertheless, the global information server may also generate by itself the corresponding version information according to the acquired global information. In some embodiments, a person skilled in the art may also respectively deploy the global information cache system and the version information management system on two servers, that is, a distributed cache server and a distributed coordination server, wherein the distributed cache server is responsible for caching the global information pushed by the global information update management control device, and the distributed coordination server is responsible for coordinating the updates process of the version information of the global information of various application servers in this region.

The global information server may send the version information of the transitional version or the latest version of the global information to a plurality of application servers in this region according to the actual needs.

In step 402, the method receives a global information acquisition request submitted by the application server.

In step 403, the method searches, in global information corresponding to version information carried in the global information acquisition request, for global information having a stop-write identification including status and requested by the application server, and return the searched global information to the application server, such that the application server provides or suspends a service provided for the global information according to an instruction of the stop-write identification including status.

The application server may submit, according to its actual needs, a global information acquisition request including current version information to the global information server. Upon receiving the global information acquisition request, the global information server may search for global information of a corresponding version according to the version information carried in the request, and return the searched global information to the application server. When the carried version information is transitional version information, corresponding transitional global information is searched for, and the searched transitional global information including a stop-write identification is returned to the application server. With respect to the acquired transitional global information, the application server may determine whether a stop-write identification is carried. If a stop-write identification is carried in the transitional global information, providing a service for the global information is suspended, and if a stop-write identification is not carried, the service for the transitional global information is provided.

In one embodiments, the method may further collect an update confirmation notification returned by the application server after updating historical version information according to the acquired version information.

The application server may update its original historical version information according to the acquired version information, and return an update confirmation notification. The global information server collects update confirmation notifications of the version information of the plurality of application servers in this region, such that the update of the version information in this region may be fed back to the global information update management control device.

In some embodiments, after the plurality of application servers in each region complete update of the global information of the transitional version and the latest version, the application server may also correspondingly modify a global information update confirmation information catalog in the version information management system of the global information server deployed in this region; the global information update management control device may then subscribe for the global information update confirmation information catalog, and upon receiving a related update notification, view an application server list with global information updated, to finally confirm that all the application servers have completed update of the global information of this version.

In some embodiments, the application server searches, in global information corresponding to version information carried in the global information acquisition request, for global information having a stop-write identification status and requested by the application server, and returns the searched global information to the application server, such that the application server provides or suspends a service provided for the global information according to an instruction of the stop-write identification status. In a scenario of large-scale and cross-region update of global information, the application server needs to suspend the service provided for the global information only when acquiring the global information having the stop-write identification. In this way, the service efficiency is improved while ensuring global data consistency.

Figure 5:
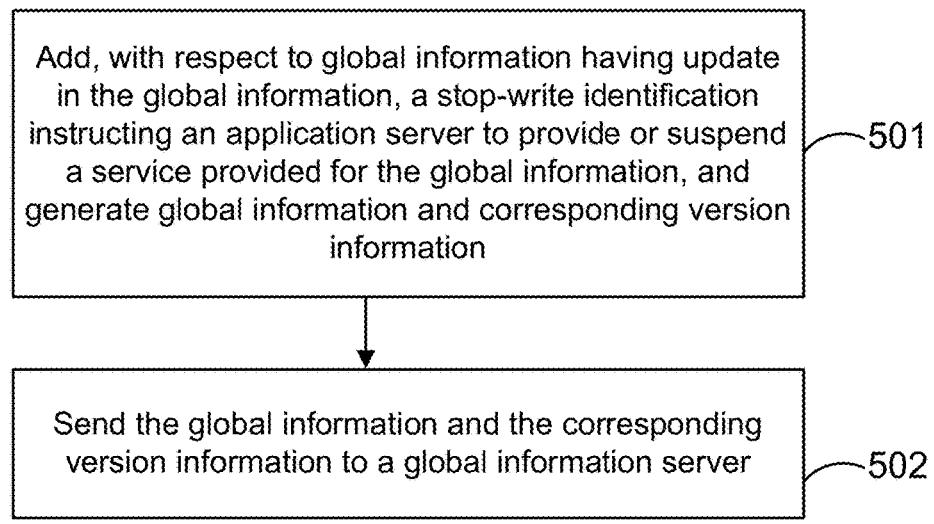
FIG. 5 is a flow diagram of steps of a method for updating global information according to some embodiments of the disclosure.

FIG. 5 is a flow diagram of steps of a method for updating global information according to some embodiments of the disclosure.

In step 501, the method adds, with respect to updated global information, a stop-write identification instructing an application server to provide or suspend a service provided for the global information, and generates global information and corresponding version information.

In step 502, the method sends the global information and the corresponding version information to a global information server.

It should be noted that in the system for updating global information of the e-commerce platform, the global information update management control device is responsible for coordinating global updates of the global information, and may determine whether to globally use global information of the latest version and to issue a corresponding instruction according to the collected update confirmation notifications.

In one embodiment, the global information update management control device may add a stop-write identification for the global information which has an updated portion in the global information. This stop-write identification is used for suspending the service related to the global information. The global information update management control device may generate global information of a latest version and corresponding version information according to the updated global information, and push the generated global information to the global information servers in various regions.

In some embodiments, transitional global information and corresponding transitional version information may be generated according to the global information having a stop-write identification status. The global information update management control device may push the global information of the transitional version and the transitional version information to the global information server. The application server may acquire, via subscription, the transitional version information, update the historical version information by using the transitional version information, and return an update confirmation notification to the global information server.

When the global information is route data, the stop-write identification is used for suspending the operations, which may cause global data inconsistency, such as writing data to the Internet data center to which the user is currently assigned or originally assigned. The global information update management control device pushes the global information of the transitional version and the corresponding transitional version information to the global information server. The global information server sends the received information to the application server. The application server may immediately continue providing services for the users upon acquiring the transitional version information.

In some embodiments, the global information update management control device adds a stop-write identification for global information having an updated portion in the global information, generates global information and corresponding version information and sends the generated information to the global information server, such that the application server acquires the global information having a stop-write identification including status from the global information server. The application server provides or suspends a service provided for the global information according to an indication of the stop-write identification including status. In a scenario of large-scale and cross-region update of global information, the application server needs to suspend the service provided for the global information only when acquiring the global information having the stop-write identification. In this way, the service efficiency is improved all the while ensuring global data consistency.

In one embodiment, the method may further collect, by using the global information server, an update confirmation notification returned by the application server after acquiring the version information and mark updates of current version information of all the application servers as complete when collecting the update confirmation notifications returned by all the application servers.

In some embodiments, the global information server collects the update confirmation notifications returned by the application servers, the global information update management-control device uniformly collects these update confirmation notifications from the global information server, or the global information update management-control device subscribes for the collections of the update confirmation notifications from the global information server, or the global information server generates an update confirmation notification list according to the collected update confirmation notifications, and sends the list to the global information update management control device. A person skilled in the art may also employ other update confirmation notification collection manners.

As compared to the embodiment where the global information update management control device directly collects update confirmation notifications from a large number of application servers, in the method for collecting update confirmation notifications, the global information update management-control device may only need to exchange information with a smaller number of global information servers to know global update details of the global information, which saves the processing resources of the global information update management control device.

The global information update management-control device collects update confirmation notifications of all the application servers by using the global information server. In this case, the global application server is ready to enable global information of a latest version, and may instruct globally enabling the global information of the latest version by indicating that the update of the version information of the current global application server is complete.

In some embodiments, upon acquiring low-volume version information, the application server immediately returns an update confirmation notification, and acquires corresponding global information from the global information server according to the updated version information. By means of decoupling the update processes of the global information and the version information, even if there are differences in various conditions such as network link, physical distance and the like, there is a relatively smaller gap between the time when various application servers acquire the version information. As such, update of the global version information may be implemented within a relatively shorter time period, and thus the efficiency of updating the global information is improved. This prevents the problem that the services in the global system are not available for a long time during the update.

In one embodiment, step 502 may comprise sending the global information and the corresponding version information to a global information cache system and a version information management system of the global information server.

In some embodiments, the global information servers may each be provided with a global information cache system and a version information management system. The global information cache system may cache global information of various versions pushed by the global information update management control device, and the version information management system may cache version information of global information of various versions pushed by the global information update management control device. Therefore, the global information update management control device may respectively send global information and version information corresponding to two systems. Nevertheless, in an alternative embodiment, the method may send the global information to the global information cache system in advance for a period of time according to the actual needs, and then send the version information to the version information management system upon sending of the global information, such that the global information is separated from the version information.

Figure 9:
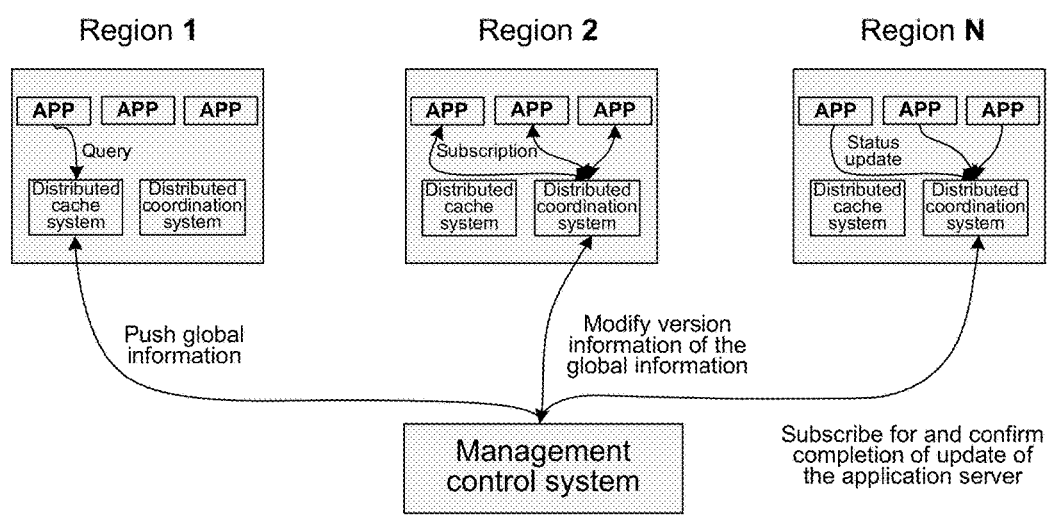
FIG. 9 is a flow diagram of update of global information according to some embodiments of the disclosure.

FIG. 9 is a flow diagram of a method of updating of global information according to some embodiments of the disclosure.

As illustrated in FIG. 9, a cross-region e-commerce platform may be equipped with a management control system, wherein the management control system is responsible for coordinating update processes of global information in a plurality of regions. Each region may be equipped with a global information server comprising a global information cache system and a version information management system, wherein each global information server is responsible for updating version information for a plurality of application servers and providing services in response to acquisition requests to route data. The management control system pushes global information of a latest version to the global information cache system of the global information server, and modifies version information of the global information of the version information management system. The application server detects the modifications made by the management control system to the version information by subscribing for the version information of the version information management system of the global information server. Upon updating its version information, the application server returns an update confirmation notification to the version information management system of the global information server. The management control system confirms that the update of the version information of the application server is complete by means of subscribing for the version information management system.

It should be noted that, with respect to the described embodiments, for brevity of description, all of the actions or steps are described as a series of action combinations. However, a person skilled in the art shall understand that the embodiments of the disclosure are not subjected to limitations of the action sequences described above. Further, based on the embodiments of the disclosure, some steps may be performed in another or other sequences or may be simultaneously performed. In addition, a person skilled in the art should also know that the embodiments described in the description herein are all preferred embodiments, and that all the involved actions are not mandatory actions of the embodiments.

Figure 6:
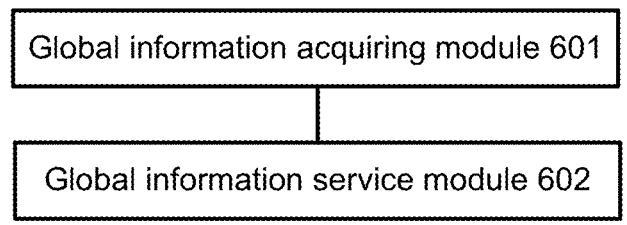
FIG. 6 is a diagram of a device for acquiring global information according to some embodiments of the disclosure.

FIG. 6 is a diagram of a device for acquiring global information according to some embodiments of the disclosure. The device in FIG. 6 illustrates an application server including a global information acquiring module 601 and a global information service module 602.

The global information acquiring module 601 may be configured to acquire current version information of global information from a global information server, and acquire corresponding global information from the global information server according to the acquired version information.

The global information service module 602 may be configured to provide or suspend a service provided for the global information according to a stop-write identification status of the acquired global information.

In one embodiment, the version information comprises transitional version information, the global information comprises transitional global information, and the global information acquiring module 601 may further include a transitional global information acquiring submodule, configured to acquire corresponding transitional global information from the global information server according to the transitional version information. Alternatively, or in conjunction with the foregoing, the global information service module 602 may include a stop-write identification judging submodule, configured to determine whether the acquired transitional global information includes a stop-write identification, if so, suspend a service provided for the global information, and if not, provide the service for the transitional global information.

In one embodiment, the global information acquiring module 601 may include a historical version information updating submodule, configured to correspondingly update historical version information according to the acquired version information, and return an update confirmation notification to the global information server. Alternatively, or in conjunction with the foregoing, the global information acquiring module 601 may include a global information acquiring submodule, configured to acquire corresponding global information from the global information server according to the updated version information.

In one embodiment, the global information is route data indicating a back-end application server correspondingly accessed by the application server. In this embodiment, the global information service module 602 may further include a route data stop-write identification determining submodule, configured to determine, with respect to a service acquisition request sent by a user, whether the route data includes a stop-write identification, and if so, return a prompt notification denying the service acquisition request to the user, and if not, access the corresponding back-end application server according to the indication of the route data.

In alternative embodiments, the device may include a validity period updating module, configured to update a validity period of historical version information according to a status of communication between the application server and the global information server.

The validity period updating module may include a first communication status confirmation information sending submodule, configured to send confirmation information of a first communication status to the global information server regularly. The validity period updating module may further include a validity period resetting submodule, configured to reset a validity period of the current version information when receiving confirmation information of a second communication status returned by the global information server within a preset period of time. The validity period updating module may further include a version information failure determining submodule, configured to determine that the current version information becomes invalid, and suspend the service provided for the transitional global information when the confirmation information of a second communication status returned by the global information server is not received within the preset period of time.

In one embodiment, the global information server may be deployed in a region of the application server and the global information server may include a global information cache server storing the global information and a version information management server storing the version information.

In some embodiments, by providing or suspending a service provided for global information according to a stop-write identification status of the global information, in a large-scale cross-region global information update scenario, the application server needs to suspend the service provided for the global information only upon acquiring the global information having a stop-write identification. In this way, the service efficiency is improved all the while ensuring global data consistency.

In addition, the application server acquires version information and acquires corresponding global information from a global information server, and the global information server independently receives global information of various versions pushed by a global information update management control device. By means of decoupling the update processes of the global information and the version information, even if there are differences in various conditions such as network link, physical distance and the like, there is a relatively smaller gap between the time when various application servers acquire the version information. As such, update of the global version information may be implemented within a relatively shorter time period, and thus the efficiency of updating the global information is improved.

Figure 7:
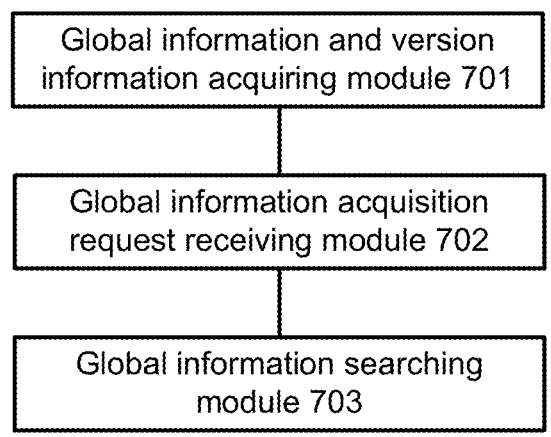
FIG. 7 is a diagram of a device for processing global information according to some embodiments of the disclosure.

FIG. 7 is a diagram of a device for processing global information according to some embodiments of the disclosure. The device in FIG. 7 illustrates a global information server including a global information and version information acquiring module 701, a global information acquisition request receiving module 702, and a global information searching module 703.

The global information and version information acquiring module 701 may be configured to acquire global information and corresponding version information from a global information update management control device, and send the version information to an application server.

The global information acquisition request receiving module 702 may be configured to receive a global information acquisition request submitted by the application server.

The global information searching module 703 may be configured to search, in global information corresponding to version information carried in the global information acquisition request, for global information having a stop-write identification status and requested by the application server, and return the searched global information to the application server, such that the application server provides or suspends a service provided for the global information according to an instruction of the stop-write identification status.

In one embodiment of the disclosure, the device may further include an update confirmation notification collecting module, configured to collect an update confirmation notification returned by the application server after updating historical version information according to the acquired version information.

In alternative embodiments, the application server searches, in global information corresponding to version information carried in the global information acquisition request, for global information having a stop-write identification status and requested by the application server, and returns the searched global information to the application server, such that the application server provides or suspends a service provided for the global information according to an instruction of the stop-write identification status. In a scenario of large-scale and cross-region update of global information, the application server needs to suspend the service provided for the global information only when acquiring the global information having the stop-write identification. In this way, the service efficiency is improved all the while ensuring global data consistency.

Figure 8:
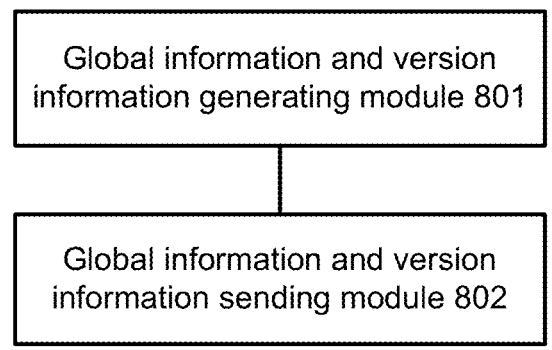
FIG. 8 is a diagram of a device for updating global information according some embodiments of the disclosure.

FIG. 8 is a diagram of a device for updating global information according to some embodiments of the disclosure. The device in FIG. 8 illustrates a global information update management control device including a global information and version information generating module 801 and a global information and version information sending module 802.

The global information and version information generating module 801 may be configured to add, with respect to global information having update in the global information, a stop-write identification instructing an application server to provide or suspend a service provided for the global information, and generate global information and corresponding version information; and The global information and version information sending module 802 may be configured to send the global information and the corresponding version information to a global information server.

In one embodiment, the device may further include an update confirmation notification collecting module and a version information update completion marking module.

The update confirmation notification collecting module may be configured to collect, by using the global information server, an update confirmation notification returned by the application server after acquiring the version information; and The version information update completion marking module may be configured to mark updates of current version information of all the application servers as complete when collecting the update confirmation notifications returned by all the application servers.

In one embodiment, the global information and version information sending module 802 may include a global information and version information correspondingly sending submodule, configured to send the global information and the corresponding version information to a global information cache system and a version information management system of the global information server.

In some embodiments, the global information update management-control device adds a stop-write identification for global information having an updated portion in the global information, generates global information and corresponding version information and sends the generated information to the global information server, such that the application server acquires the global information having a stop-write identification status from the global information server. The application server provides or suspends a service provided for the global information according to an indication of the stop-write identification status. In a scenario of large-scale and cross-region update of global information, the application server needs to suspend the service provided for the global information only when acquiring the global information having the stop-write identification. In this way, the service efficiency is improved all the while ensuring global data consistency.

Since the device embodiments are substantially similar to the method embodiments, brief description is given thereto. The related portions may be referenced to the description of the portions in the method embodiments.

Figure 13:
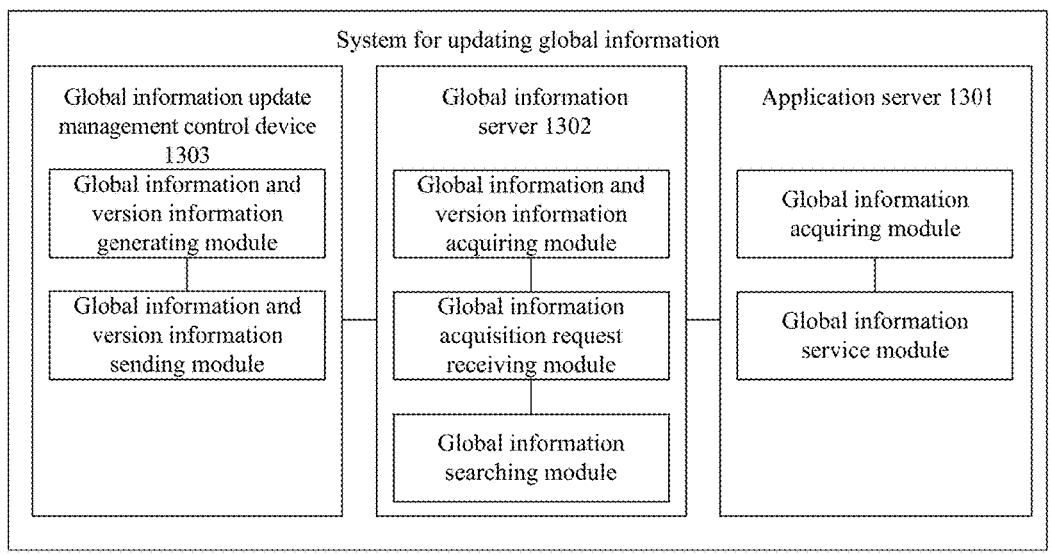
FIG. 13 is a diagram of a system for updating global information according to some embodiments of the disclosure.

FIG. 13 is a diagram of a system for updating global information according to some embodiments of the disclosure. The system illustrated in FIG. 13 includes an application server 1301, a global information server 1302 and a global information update management control device 1303. The application server 1301 may include a global information acquiring module and a global information service module.

The global information acquiring module may be configured to acquire current version information of global information from a global information server, and acquire corresponding global information from the global information server according to the acquired version information; and The global information service module may be configured to provide or suspend a service provided for the global information according to a stop-write identification status of the acquired global information.

The global information server 1302 may include a global information and version information acquiring module, a global information acquisition request receiving module, and a global information searching module.

The global information and version information acquiring module may be configured to acquire global information and corresponding version information from a global information update management control device, and send the version information to an application server;

The global information acquisition request receiving module may be configured to receive a global information acquisition request submitted by the application server.

The global information searching module may be configured to search, in global information corresponding to version information carried in the global information acquisition request, for global information having a stop-write identification status and requested by the application server, and return the searched global information to the application server, such that the application server provides or suspends a service provided for the global information according to an instruction of the stop-write identification status.

The global information update management control device 1303 may include a global information and version information generating module and a global information and version information sending module.

The global information and version information generating module may be configured to add, with respect to global information having update in the global information, a stop-write identification instructing an application server to provide or suspend a service provided for the global information, and generate global information and corresponding version information; and The global information and version information sending module may be configured to send the global information and the corresponding version information to a global information server.

In some embodiments, by providing or suspending a service provided for global information according to a stop-write identification status of the global information, in a large-scale cross-region global information update scenario, the application server needs to suspend the service provided for the global information only upon acquiring the global information having a stop-write identification. In this way, the service efficiency is improved all the while ensuring global data consistency.

In addition, the application server acquires version information and acquires corresponding global information from a global information server, and the global information server independently receives global information of various versions pushed by a global information update management control device. By means of decoupling the update processes of the global information and the version information, even if there are differences in various conditions such as network link, physical distance and the like, there is a relatively smaller gap between the time when various application servers acquire the version information. As such, update of the global version information may be implemented within a relatively shorter time period, and thus the efficiency of updating the global information is improved.

Figure 14:
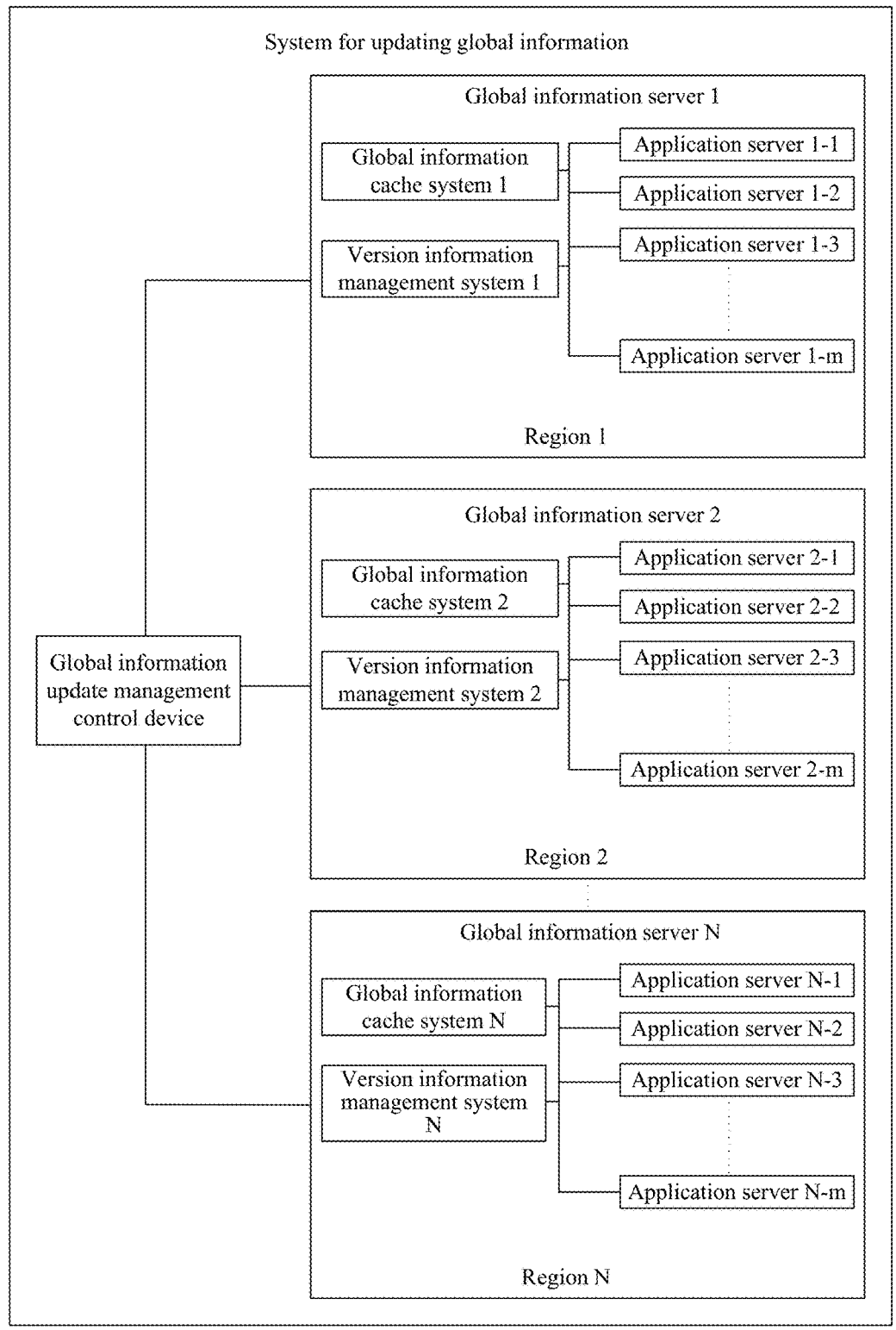
FIG. 14 is an architectural diagram of a system for updating global information according some embodiments of the disclosure.

FIG. 14 is an architectural diagram of a system for updating global information according to some embodiments of the disclosure.

As illustrated in FIG. 14, the system for updating global information is provided with a global information update management control device which is responsible for coordinating update processes of global information in a plurality of regions. To be specific, the global information update management control device may actively push updated global information and corresponding version information to the global information servers deployed in the plurality of regions, or correspondingly modify version information of the global information servers upon pushing the updated global information to the global information servers deployed in the plurality of regions.

The global information server may be deployed in a region of the application server. In some embodiments, the global information server may be provided with a global information cache system and a version information management system. The global information cache system may cache the global information of various versions pushed by the global information update management control device. The version information management system may cache version information of the global information of various versions pushed by the global information update management control device, or receive modifications made by the global information update management control device on the stored version information. In addition, the version information management system is also responsible for coordinating update processes of the version information of the global information of various application servers in a region, so as to ensure data consistency of the global information.

The application servers may be various application servers corresponding to various applications, which may sense latest version information pushed by the global information update management control device to the global information servers or the modifications made to the version information by subscribing for latest version information of the global information from the version information management system of the global information server in this region, and may acquire the latest version information of the global information from the global information servers.

Various embodiments in the specification are described in a progressive manner. The same or similar parts between the embodiments may be referenced to each other. In each embodiment, the portion that is different from other embodiments is concentrated and described.

Those skilled in the art shall understand that the embodiments of the disclosure may be described as illustrating methods, devices, or computer program products. Therefore, hardware embodiments, software embodiments, or hardware-plus-software embodiments may be used to illustrate the embodiments of the disclosure. In addition, the embodiments of the disclosure may further employ a computer program product which may be implemented by at least one non-transitory computer-readable storage medium with an executable program code stored thereon. The non-transitory computer-readable storage medium includes, but is not limited to, a disk memory, a CD-ROM, and an optical memory.

In a typical configuration, a computer device includes one or more central processing units (CPUs), input/output (I/O) interfaces, network interfaces, and memories. The memory may include computer-readable media such as a volatile memory, a random access memory (RAM) and/or other forms of nonvolatile memories, such as a read only memory (ROM) or a flash random access memory (flash RAM). An example of the computer-readable medium is the memory. The computer-readable media include permanent and non-permanent media, and removable and non-removable media, which may implement information storage by using any method or technology. The information may be computer-readable instructions, data structures, program modules or other data. Examples of computer storage mediums include, but are not limited to, a phase change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, compact disc read-only memory (CD-ROM), a digital versatile disk (DVD) or other optical storage devices, a magnetic cassette, a magnetic tape magnetic disk storage device or other magnetic storage devices, or any other non-transmission media, which may be used to store information that can be accessed by a computing device. According to the definition in this specification, the computer-readable medium does not include a transitory computer-readable medium, such as modulated data signals and carriers.

The embodiments of the disclosure are described based on the flow diagrams and/or block diagrams of the method, terminal device (system), and computer program product. It should be understood that each process and/or block in the flow diagrams and/or block diagrams, and any combination of the processes and/or blocks in the flow diagrams and/or block diagrams may be implemented using computer program instructions. These computer program instructions may be issued to a general computer, a dedicated computer, an embedded processor, or processors of other programmable data processing terminal device to generate a machine, which enables the computer or the processors of other programmable data processing terminal devices to execute the instructions to implement a device for implementing specific functions in at least one process in the flow diagrams and/or at least one block in the block diagrams.

These computer program instructions may also be stored in a non-transitory computer-readable memory capable of causing a computer or other programmable data processing terminal devices to work in a specific mode, such that the instructions stored on the non-transitory computer-readable memory implement a product comprising an instruction device, wherein the instruction device implements specific functions in at least one process in the flow diagrams and/or at least one block in the block diagrams.

These computer program instructions may also be stored on a computer or other programmable data processing terminal devices, such that the computer or the other programmable data processing terminal devices execute a series of operations or steps to implement processing of the computer. In this way, the instructions, when executed on the computer or the other programmable data processing terminal devices, implement the specific functions in at least one process in the flow diagrams and/or at least one block in the block diagrams.

Although preferred embodiments of the disclosure are described, those skilled in the art may make modifications and variations to these embodiments based on the basic inventive concept of the disclosure. Therefore, the appended claims are interpreted as covering the preferred embodiments and all such modifications and variations falling within the protection scope of the embodiments of the disclosure.

Finally, it should be noted that, in this specification, such relationship-related terms as "first" and "second" are only used to differentiate one entity or operation from another entity or operation, but are not intended to require or imply that there is a practical relationship or sequence between these entities or operations. It should be noted that, in this specification, terms "comprises", "comprising", "has", "having", "includes", "including", "contains", "containing" or any other variation thereof, are intended to cover a non-exclusive inclusion, such that a process, method, article, or terminal device, that comprises, has, includes, contains a list of elements does not include only those elements, but may include other elements not expressly listed or inherent to such a process, method, article, or terminal device. An element proceeded by "comprises . . . a", "has . . . a", "includes . . . a", "contains . . . a" does not, without more constraints, preclude the existence of additional identical elements in the process, method, article, or terminal device.

Although the method and device for acquiring global information, the method and device for processing global information, and method and device for updating global information according to the disclosure have been described in detail herein, and the principles and embodiments of the disclosure have been described with reference to specific embodiments and examples, the above embodiments are described only to help understanding of the method and core idea of the disclosure. Persons of ordinary skill in the art may make modification or variations to the specific embodiments or application scopes according to the inventive concept of the disclosure. In conclusion, this specification shall not be understood as limiting the disclosure.

What is claimed is:

1. A method for managing a network service, the method comprising:
   providing, by a server, a network service using first global information, the first global information shared among the server and at least one additional server;
   receiving, by the server, current version information from a global information server, the current version information associated with current global information and associated with the network service, the current global information comprising a current version of the first global information;
   retrieving, by the server, the current global information associated with the current version information and associated with the network service from the global information server; and
   providing or suspending, by the server, the network service associated with the current global information based on a presence of a stop-write identifier in the current global information.

2. The method of claim 1 wherein the current version information comprises version information indicating a latest version of the global information.

3. The method of claim 1 wherein the current version information comprises transitional version information, the current global information comprises transitional global information, and providing or suspending the network service comprises providing or suspending the network service based on the presence of a stop-write identifier in the transitional global information.

4. The method of claim 1 further comprising: updating, by the server, a validity period of historical version information associated with the network service based on a status of communications with the global information server, wherein the historical version information comprises version information temporally preceding the current version information.

5. The method of claim 4, wherein updating, by the server, a validity period of historical version information associated with the network service based on a status of communications with the global information server comprises:
   transmitting, by the server, confirmation information of a first communication status to the global information server according to a preset period of time;
   resetting, by the server, a validity period of the current version information when receiving confirmation information of a second communication returned by the global information server within a preset period of time; and
   suspending, by the server, the network service associated with the current information when the confirmation information of a second communication status returned by the global information server is not received within the preset period of time.

6. The method of claim 1, further comprising:
   updating, by the server, historical version information based on the current version information;
   transmitting, by the server, an update confirmation notification to the global information server; and
   retrieving, by the server, the current global information from the global information server according to the updated historical version information.

7. The method of claim 1, wherein the global information is route data indicating a back-end application server associated with the network service.

8. The method of claim 7 wherein suspending the network service comprises suspending an operation executed by the back-end server and requested by the user.

9. The method of claim 1 wherein providing or suspending the network service associated with the current global information based on a presence of a stop-write identifier in the current global information comprises:
   receiving, by the server, a service acquisition request including a user identifier;
   identifying, by the server, the current global information associated with the user identifier;

transmitting, by the server, a notification denying the service acquisition request to the user if the current global information includes a stop-write identification; and granting, by the server, access to a back-end application server associated with the route data if the current global information does not include a stop-write identification.

10. An apparatus for managing a network service, the apparatus comprising:
a processor; and
a non-transitory memory storing computer-executable instructions therein that, when executed by the processor, cause the apparatus to:
provide a network service using first global information, the first global information shared among the apparatus and at least one additional apparatus;
receive current version information from a global information server, the current version information associated with current global information and associated with the network service, the current global information comprising a current version of the first global information;
retrieve the current global information associated with the current version information and associated with the network service from the global information server; and
provide or suspend the network service associated with the current global information based on a presence of a stop-write identifier in the current global information.

11. The apparatus of claim 10 wherein the current version information comprises version information indicating a latest version of the global information.

12. The apparatus of claim 10 wherein the current version information comprises transitional version information, the current global information comprises transitional global information, and the instructions causing the apparatus to provide or suspend the network service comprise instructions causing the apparatus to provide or suspend the network service based on the presence of a stop-write identifier in the transitional global information.

13. The apparatus of claim 10 wherein the instructions further cause the apparatus to:
update a validity period of historical version information associated with the network service based on a status of communications with the global information server, wherein the historical version information comprises version information temporally preceding the current version information.

14. The apparatus of claim 13, wherein the instructions causing the apparatus to update a validity period of historical version information associated with the network service based on a status of communications with the global information server further include instructions causing the apparatus to:
transmit confirmation information of a first communication status to the global information server according to a preset period of time;
reset a validity period of the current version information when receiving confirmation information of a second communication returned by the global information server within a preset period of time; and
suspend the network service associated with the current information when the confirmation information of a second communication status returned by the global information server is not received within the preset period of time.

15. The apparatus of claim 10, wherein the instructions further cause the apparatus to:
update historical version information based on the current version information;
transmit an update confirmation notification to the global information server; and
retrieve the current global information from the global information server according to the updated historical version information.

16. The apparatus of claim 10, wherein the global information is route data indicating a back-end application server associated with the network service.

17. The apparatus of claim 16 wherein suspending the network service comprises suspending an operation executed by the back-end server and requested by the user.

18. The apparatus of claim 10 wherein the instructions causing the apparatus to suspend the network service associated with the current global information based on a presence of a stop-write identifier in the current global information further include instructions causing the apparatus to:
receive a service acquisition request including a user identifier;
identify the current global information associated with the user identifier;
transmit a notification denying the service acquisition request to the user if the current global information includes a stop-write identification; and
grant access to a back-end application server associated with the route data if the current global information does not include a stop-write identification.

19. A system for managing a network service, the system comprising:
a global information server used for storing version information and global information;
a global information update management control device used for transmitting version information and global information to the global information server;
an application server used for:
providing a network service using first global information, the first global information shared among the application server and at least one additional application server;
receiving current version information from a global information server, the current version information associated with current global information and associated with the network service, the current global information comprising a current version of the first global information;
retrieving the current global information associated with the current version information and associated with the network service from the global information server; and
providing or suspend the network service associated with the current global information based on a presence of a stop-write identifier in the current global information.

20. The system of claim 19 wherein the global information update management control device further includes:
a global information and version information generating module, used for adding, with respect to global information having updates, a stop-write identification enabling the application server to provide or suspend a service associated with the global information, and generate global information and corresponding version information; and a global information and version information sending module, used for sending the global information and the corresponding version information to a global information server.

\* \* \* \* \*